United States Patent
Asaduzzaman et al.

(10) Patent No.: US 9,584,601 B2
(45) Date of Patent: Feb. 28, 2017

(54) COMMUNICATION SYSTEM WITH TRANSPORT LINK MECHANISM AND METHOD OF OPERATION THEREOF

(71) Applicant: Telenav, Inc., Sunnyvale, CA (US)

(72) Inventors: Shah Asaduzzaman, Sunnyvale, CA (US); Md Ahsan Habib, Santa Clara, CA (US); Dmitri Azovtsev, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 626 days.

(21) Appl. No.: 14/013,198

(22) Filed: Aug. 29, 2013

(65) Prior Publication Data

US 2015/0067175 A1    Mar. 5, 2015

(51) Int. Cl.
  *G06F 15/16* (2006.01)
  *H04L 29/08* (2006.01)
  *H04W 4/04* (2009.01)

(52) U.S. Cl.
  CPC ............ *H04L 67/14* (2013.01); *H04W 4/046* (2013.01)

(58) Field of Classification Search
  CPC ......... H04W 4/046; H04L 67/14; H04L 29/08
  See application file for complete search history.

(56) References Cited

U.S. PATENT DOCUMENTS

| | | |
|---|---|---|
| 6,691,302 B1 | 2/2004 | Skrzynski et al. |
| 7,451,005 B2 | 11/2008 | Hoffberg et al. |
| 7,764,690 B2 | 7/2010 | Heidari-Bateni et al. |
| 2003/0081759 A1* | 5/2003 | Harris ............... H04M 1/74 379/395.01 |
| 2006/0031378 A1* | 2/2006 | Vallapureddy ....... A61B 5/0031 709/208 |
| 2006/0200565 A1 | 9/2006 | Ng et al. |
| 2007/0294710 A1 | 12/2007 | Messeman et al. |
| 2010/0233961 A1* | 9/2010 | Holden ............... G06F 13/385 455/41.3 |
| 2012/0311614 A1 | 12/2012 | Deanna et al. |

* cited by examiner

*Primary Examiner* — Arvin Eskandarnia
(74) *Attorney, Agent, or Firm* — IP Investment Law Group

(57) ABSTRACT

A method of operation of a communication system includes: adapting an application programming interface (API) for communicating with an application using a control unit; identifying a detection signal for identifying a physical transport for communication with the application through the application programming interface (API); arbitrating a physical transport protocol for the physical transport with the application programming interface (API); and connecting a transport wrapper for the transport protocol with the application programming interface (API) for communicating with the physical transport.

20 Claims, 7 Drawing Sheets

COMMUNICATION SYSTEM WITH TRANSPORT LINK MECHANISM AND METHOD OF OPERATION THEREOF

TECHNICAL FIELD

An embodiment of the present invention relates generally to a communication system, and more particularly to a system for linking

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a widespread basis in a variety of different platforms.

For example, communication networks, both wired and wireless, are now commonplace in many homes, offices, and other environments. Such communication networks allow various heretofore independent devices to share data and other information to enhance productivity or simply to improve their convenience to the user.

Many and varied technologies and protocols for this communication can now be made available. Typically, only some of the many modes of communication technologies and protocols are available at a given time, in a given location, but the particular technologies and protocols can change as in the case of moving mobile devices.

Thus, a need still remains for communication systems with link mechanisms. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a communication system including: adapting an application programming interface (API) for communicating with an application using a control unit; detecting a detection signal for identifying a physical transport for communication with the application through the application programming interface (API); arbitrating a physical transport protocol for the physical transport with the application programming interface (API); and connecting a transport wrapper for the transport protocol with the application programming interface (API) for communicating with the physical transport.

An embodiment of the present invention provides a method of operation of a communication system including: adapting an application programming interface (API) for communicating with an application using a control unit; detecting a detection signal for identifying a physical transport for communication with the application through the application programming interface (API); arbitrating a physical transport protocol for the physical transport with the application programming interface (API); connecting a transport wrapper for the transport protocol with the application programming interface (API) for communicating with the physical transport; and transmitting data for communication between the application and the physical transport.

An embodiment of the present invention provides a communication system, including: an application adaptation module configured to adapt an application programming interface (API) for communicating with an application; a transport arbitration module coupled to the application adaptation module configured to detect a detection signal for identifying a physical transport for communication with the application through the application programming interface (API); a unified transport interface module coupled to the transport arbitration module configured to arbitrate a physical transport protocol for the physical transport with the application programming interface (API); and a transport abstraction module coupled to the unified transport interface module configured to connect a transport wrapper for the transport protocol with the application programming interface (API) for communicating with the physical transport.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
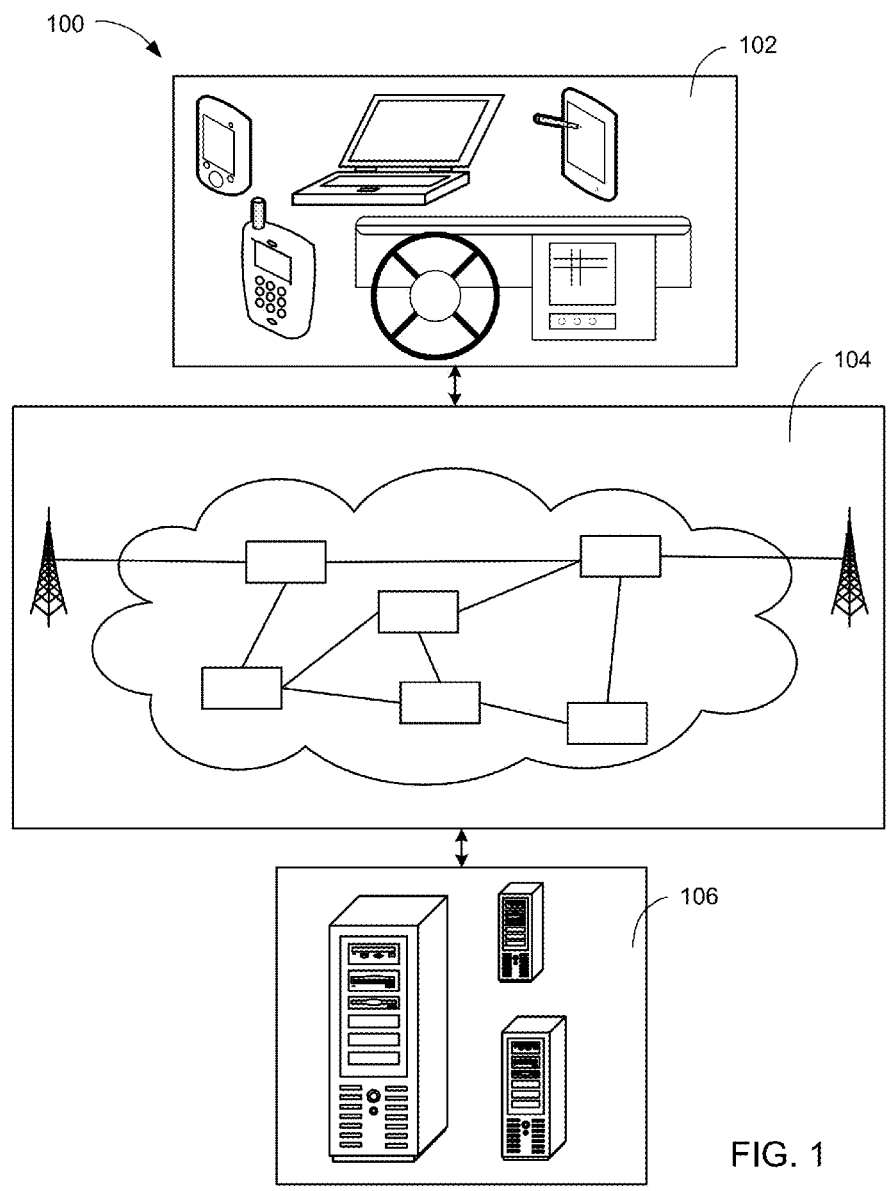
FIG. 1 is a communication system with transport link mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar order, this depiction in the figures is arbitrary for the most part. Generally, the invention can be operated in any order. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

With the enormous growth in the smart-phone applications area, there is an increasing desire to bring in the smart-phone applications into the infotainment head-unit systems in automobiles. A key technology that can enable such an in-dash user experience is the connectivity between smart phones and automotive systems such as automotive head-units. Various technologies for communication such as WiFi, Bluetooth, or USB cables are enabled in both smart-phones and auto head-units. However, there is no application that enables seamless connection between the phone and the car without any human interaction on one hand, and development of applications without worrying about which mode of communication is available on the other hand.

Thus an "Application Programming Interface" (API), such as Telenav Link or TnLink, provides an application developer concurrent use of multiple physical communication media without knowing what media exist or without worrying about the different communication protocol for each medium.

Referring now to FIG. 1, therein is shown a communication system 100 with transport link mechanism in an embodiment of the present invention. The communication system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of communicating devices, such as a cellular phone, personal digital assistant, a notebook computer, a liquid crystal display (LCD) system, a light emitting diode (LED) system, an in-dash device, an in-dash system, or other multi-functional display or entertainment device. The first device 102 can couple, either directly or indirectly, to the communication path 104 to communicate with the second device 106 or can be a stand-alone device.

For illustrative purposes, the communication system 100 is described with the first device 102 as a communicating device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the communication system 100 is described with the second device 106 as a computing device, although it is understood that the second device 106 can be different types of devices. Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
FIG. 2 is an example of a display interface of the first device of FIG. 1.

Referring now to FIG. 2, therein is shown an example of a display interface 202 of the communication system 100. The first device 102 can optionally include a handheld device including a smart phone or an infotainment device including an in-dash system or an automotive system such as an automotive head-unit.

Similarly the display interface 202 can also be optionally included in the second device 106 of FIG. 1. The display interface 202 of the second device 106 can also include a handheld device including a smart phone or an infotainment device including an in-dash device or an automotive head-unit.

The display interface 202 can provide a visual image of locations and objects in the physical world transformed for display. The visual image preferably updates or changes as the first device 102 or the second device 106 moves in the physical world. The display interface 202 can also provide status, confirmation, selection, control, or combination thereof, of communication with the first device 102, the second device 106, or combination thereof.

Figure 3:
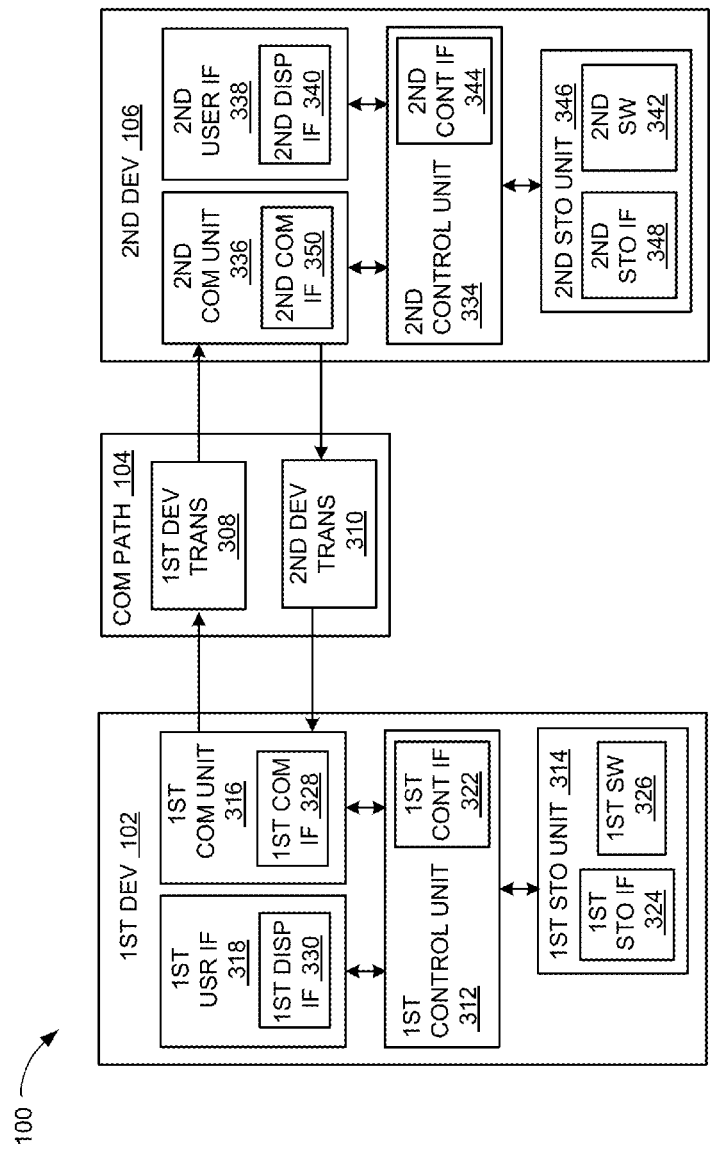
FIG. 3 is an exemplary block diagram of the communication system.

Referring now to FIG. 3, therein is shown an exemplary block diagram of the communication system 100. The communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the communication system 100. The first control unit 312 can also execute the first software 326 for the other functions of the communication system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The communication system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 4:
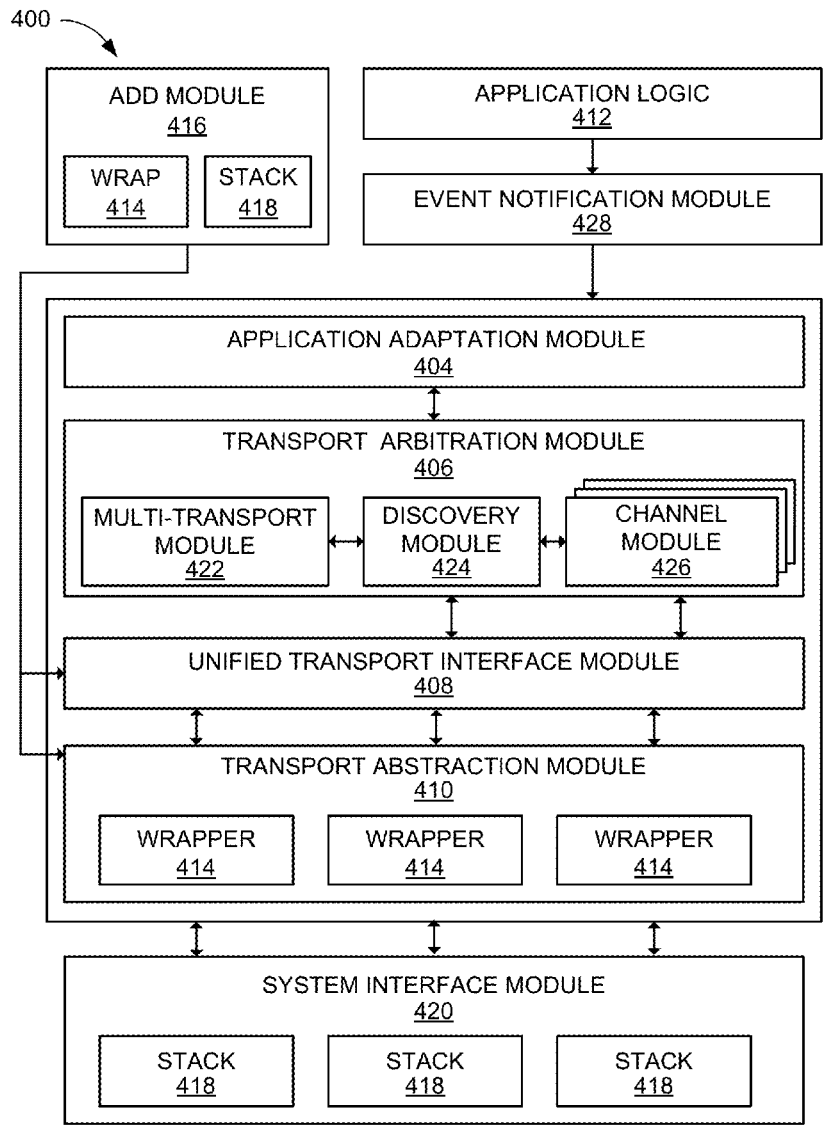
FIG. 4 is a control flow for an application programming interface system of the communication system in an embodiment of the present invention.

Referring now to FIG. 4, therein is shown a control flow for an application programming interface system 400 of the communication system 100 in an embodiment of the present invention. An application programming interface (API) 402 such as an API 402 including Telenav Link preferably includes an application adaptation module 404, a transport arbitration module 406, a unified transport interface module 408, and a transport abstraction module 410.

The unified transport interface module 406 can preferably enable application 412 or application logic 412 communications through multiple communication protocols including physical transports. The interface can provide asynchronous network 10 operations to allow maximum resource utilization.

The API 402 including a Telenav Link can be organized into multiple layers such as a Transport Abstraction Layer and a Transport Arbitration Layer. The transport abstraction module 410 can include the Transport Abstraction Layer of the transport abstraction module 410, which can include each transport medium or interconnect available in the system wrapped by a transport wrapper 414.

The transport wrapper 414 preferably adapts the communication protocol including physical transports, such as an underlying medium-access API provided by an operating system, device drivers, or combination thereof, into a Unified Transport API of the unified transport interface module 408. Thus a Transport Arbitration Layer of the transport arbitration module 404 can use the access transports based on the Unified Transport API of the unified transport interface module 408.

As an example, the API 400 including the Telenav Link can be implemented in C programming language. For application use, an additional Application Adaptation Layer of the application adaptation module 402 can be coupled to or interface with the Transport Arbitration Layer of the transport arbitration module 406, for binding application programming interfaces into other languages, applications, or combination thereof.

Further for example, to load the API 400 including the Telenav Link, an application preferably calls an initialization API. The initialization API could be implemented in C language as follows:

--- int initTnlink( ); // returns a handle to a Telenav Link object, as an integer.

---

For C++ and other object oriented languages, this initialization API can be bound as an object construction. Note that the API 400 including the Telenav Link can connect to another of the API 400 including another Telenav Link. Thus, for two applications or two modules of one application to couple, interface, or talk to each other, each application or module preferably initializes the API 400 including the Telenav Link object.

The API 402 including the Telenav Link preferably includes a plug-in mechanism for adding transport-wrappers for new kinds of transport wrappers on the fly. The Telenav Link can expose different types, sets, or combination thereof, of APIs to an application that uses the Telenav Link through different implementations of the application adaptation module 404.

An add transport module 416 can preferably integrate other communication protocol including physical transports such WiFi, Bluetooth, USB, a proprietary Bluetooth stack, other communication transports, or combination thereof. The API 400 including the Telenav Link can provide integration of other communication protocols including proprietary physical protocol stacks utilizing a plug-in format or plug-in model for transport wrappers 414. The plugin architecture of the transport application can allows additional transport abstraction modules to be added at run time.

For example, an event-based function or application programming interface (API) can connect other components or function to the Telenav Link using an event-bus connector such as a Telenav Link object constructed or initialized to plugs-in relevant transport wrappers using an addTransport API. The transport arbitration module 406 arbitrates communication transports and initiates a connection procedure automatically. Once a connection is established, the Telenav Link is notified using a "Connected" event. If the connection is broken, the application is notified using a "Disconnected" event. The Telenav Link publishes a "SendPacket" event to send data and a "PacketReceived" event when data is received from another device such as a remote peer.

As another example, each of the transport wrappers 414 can connect, be integrated in, or be plugged into the API 402 using the add transport module 416 including the addTransport API. Other of the transport wrappers 414 including new transport wrappers or custom transport wrappers can be provided for any transport medium, interconnect, or physical protocol stack 418 of an operating system interface module 420 or a system interface module 420 including a proprietary physical transport protocol, medium, or interconnect with an appropriate protocol stack 418 or proprietary protocol stack 418.

Further for example, the transport wrapper 414 such as the custom transport wrapper can then be connected, integrated, or "plugged in" with the transport wrappers including default wrappers that can be packaged with the API 402 including the Telenav Link. The addTransport API can be implemented as follows:

```
void addTransport(int handle, TransportWrapper* wrapper, int
    endpointType, int priority);
```

The add transport module 416 including the addTransport API can define a wrapper plugin object as well as two other parameters related to the transport wrapper 414. The API 402 including the Telenav Link preferably provides point-to-point communication including one end of the transport medium can act as a connection initiator, the other end can act as a connection acceptor. This initiator-acceptor mode can be defined in an endpointType parameter. The priority endpointType parameter can define priority of a transport medium particularly in arbitrating among multiple transport mediums.

In the Transport Arbitration Layer of the transport arbitration module 406, a multi-transport arbitrator module 422 tries the available transports to establish a connection. For example, by default, all available transports are attempted in parallel and whichever responds first is accessed for further data-communication. This default arbitration policy can be overridden by a setTranpsortArbitrationPolicy API. At least three policies can be parallel, round_robin, or priority_order.

void setTransportArbitrationPolicy(int policy);

Further for example, by default, the API 402 including the Telenav Link would not attempt other transports while one connected session is ongoing. A new connection is attempted only when an existing connection is terminated, disconnected or otherwise broken. Allowing or preventing concurrent connections can be set by a flag or preference for multiple connections. The preferred default for this setting can be overridden, and multiple concurrent connections, over different or same medium, can be allowed by invoking an allowMultipleConnection API.

void allowMultipleConnections(int trueFalseFlag);

Depending on preference settings, switching to other transport can be allowed. There would be little value or sense to add two or more USB cables between one pair of devices. However, multiple physical wireless channels could be used such as in case of Bluetooth or WiFi, for redundancy, additional bandwidth, or combination thereof Multiple connected data channels can be established between the smart-phone and head-unit, if needed. All data channels can be full-duplex and can carry arbitrary binary data. For portable serialization of data over the wire, a protocol buffer serialization application can be leveraged.

The transport wrappers 414 provide access to the unified transport interface module 408 including the Unified Transport API, a discovery module 424, a data channel module 426, or combination thereof. Each of the transport wrappers 414 provides an interface, makes available, or exposes one or more of the wrappers 414 or Transport APIs that the Transport Arbitration Layer of the transport arbitration module 406 can interface with, access, or use. There can be one or more functions defined in the Unified Transport API of the unified transport interface module 408. Following are six examples:

1. discoverAndConnect
   2. advertiseAndAccept
   3. asyncSend
   4. asyncRecv
   5. closeConnection
   6. cancel The first four Unified Transport APIs can be asynchronous function calls. The last two are preferably for management of prior asynchronous calls. Each of the asynchronous functions can have the following pattern:

int asyncFunction(onCompletionCallback, . . . [other parameters])

Each of the Unified Transport APIs can return a success/failure Boolean flag. Also each function can take a callback function pointer as a parameter that is called on at the completion of an asynchronous operation. As asynchronous functions, these functions preferably return results such as a return value immediately.

For example, if the return value indicates a failure, the implication is that initiation of the asynchronous operation failed, thus a completion callback function may not be called afterwards. On the other hand, if the return value indicates a success, the implication is that the asynchronous operation was initiated successfully. In this case, the completion callback function may be called exactly once.

Completion of a function call, such as the Unified Transport APIs, may be a success or failure. This can be denoted using an error code parameter in a completion function such as the completion callback function. In the event of a successful function call, the discovery module 424 can function as a session manager module 424 coupled to the connected data channel module 426.

Of the functions preferably defined in the discovery module 424 or the connected data channel module 426 of the Unified Transport API, two examples can establish a connection. The first two functions, discoverAndConnect and advertiseAndAccept, can be used for establishing a connection.

Each transport can be configured either as acceptor or as initiator of a connection when being plugged into the application programming interface (API) 402 such as an API 402 including the Telenav Link using the addTransport API. The acceptor side can use the advertiseAndAccept API and the initiator side can use the discoverAndConnect API. Those are specified as properties of the transport. Examples of these two functions are as follows:

```
int (* discoverAndConnect)(void* caller, OnConnectCallback
    connectHandler)
int (* advertiseAndAccept)(void* caller, OnAcceptCallback
    acceptHandler);
```

The syntax of OnConnectCallback and OnAcceptCallback can be similar as follows:

```
typedef void (*OnConnectCallback)        (void *caller,
    ConnectionHandle conn, TnlinkError error);
typedef void (*OnAcceptCallback)         (void *caller,
    ConnectionHandle conn, TnlinkError error);
```

In both cases, the ConnectionHandle parameter represents a connection such as an established bi-directional channel, for sending and receiving data. The error-code parameter denotes the type of error if the process failed.

In addition, there can be a caller reference parameter in all four examples of asynchronous APIs. The caller reference parameter can provide support for object-oriented users of the asynchronous APIs. The caller reference parameter preferably contains a reference to the object that invoked the asynchronous API. When a corresponding callback is invoked, the same reference to the object is passed back, so that the object that was called can be tracked.

For example, the endpoint for connection such as port number, service ID, or combination thereof, might not be specified in the discoverAndConnect or the advertiseAndAccept function calls. This would abstract the actual or exact discovery mechanism used by the underlying transport.

Further to the example, if the transport is Bluetooth, the API 402 can use a Bluetooth Service Discover Protocol to look for the API 402 including a Telenav Link running in any of the Bluetooth paired devices. If the transport is WiFi, the API 402 can use a User Datagram Protocol (UDP) broadcast to identify any device running the API 402 including a Telenav Link in the same network to respond to a query message. For USB, it looks for the API 402 including a Telenav Link running in the USB connected device and so on.

If the API 402 finds a service such as Bluetooth, WiFi, or USB, it connects to the remote device. The API 402 including the Telenav Link can be configured to establish a communication protocol channel automatically, unconditionally, or combination thereof, if an API 402 capable remote device is present. If authentication or establishment of a secure communication protocol channel is required, authentication such as a handshaking protocol can be provided or implemented on the connection such as an established raw data pipe. If authentication fails, the data pipe can be closed by the closeConnection API.

Thus the API 402 can optionally automatically connect to a device it 'detects' having supported, active, and unused transport service such as Bluetooth, WiFi, USB, other communication protocol, or other transport protocols. Optionally, the API 402 can automatically connect if an application in a device requests a connection, that is, connections only if there is a purpose for the connection.

Sending and receiving data once a connection is established can include a send, a receive, or combination thereof for arbitrary binary data. For example, the following two APIs are configured to provide the aforementioned send, receive, or combination thereof.

```
int (* asyncSend)(void* caller, ConnectionHandle conn, const
    char* buffer, int size, OnSendCompleteCallback sendHandler);
int (* asyncRecv)(void* caller, ConnectionHandle conn, char*
    buffer, int size, OnReceiveCallback receiveHandler);
```

These two APIs include return value, caller-tracking, completion callback, in a manner similar to other asynchronous APIs previously described. The ConnectionHandle parameter is used to designate a connection over which data is being sent or received. As such, multiple logical channels, communication protocol channels, or communication protocol connections are supported over a single physical medium. An arbitrary number of new logical connections can be established using the discoverandConnect API and advertiseAndAccept API.

For both the asyncSend API and the asyncRecv API, a reference to a pre-allocated byte buffer is passed, along with a buffer size. In the case of a send, the buffer is filled with data to send. In the case of a receive, the buffer is filled with received data preferably at the end of an asynchronous receive operation.

The completion handlers can have the following syntax:

```
typedef void (*OnSendCompleteCallback)         (void *caller,
    ConnectionHandle conn, int bytes_transferred, TnlinkError error);
typedef void (*OnReceiveCallback )             (void *caller,
    ConnectionHandle conn, int bytes_transferred, TnlinkError error);
```

The asynchronous send or receive process initiated by the asyncSend API and asyncRecv API preferably completes when transfer of all bytes intended to send or receive is completed, or an error occurred. In either case, the number of actual bytes transferred can be mentioned as a parameter in the callback function.

Further regarding asynchronous calls and based on previous descriptions of the asynchronous API including return values, completion callback and caller-tracking, these APIs do not need to be reentrant. Preferably only one function will be called at a time. The API is not meant to have any concurrency control built into it.

The implementations for initiation of connections with the discoverAndConnect API and the advertiseAndAccept API can preferably be called one at time for any given time. It is also preferable that only one of the initiations of the connections is ongoing.

Similarly, for data send/receive APIs such as asyncSend API and the asyncRecv API, preferably only one send or receive operation is ongoing on a given connection at any given time. Optionally, one send and one receive can be ongoing concurrently on the same connection. A further option can include two different connections having one connection with a send or a receive concurrent to the other connection with a send or receive.

A previously established connection can be closed using a closeConnection API such as the following:

void (* closeConnection) (ConnectionHandle conn);

When the previously established connection is closed, all pending asynchronous send/receive operations or APIs initiated on or associated with that connection are preferably closed or cancelled. This would preferably invoke completion callback functions with an error. The closeConnection function preferably returns a result or completes only after all pending operations are closed or cancelled, and all corresponding completion callback functions are called and returned.

A previously attempted initiation of a connection can be cancelled using a cancel API such as the following:

void (* cancel) ( );

When the cancel API is called, the previously invoked discoverAndconnect API or advertiseAndAccept API functions or operations close, cancel, or terminate and the corresponding completion callback functions are preferably invoked or called and can return a failure notification. The cancel API function preferably returns a result or completes after all pending operations are closed or canceled, and all corresponding completion callback functions are called and returned.

Note that the closeConnection function or API, and cancel function or API, are preferably synchronous APIs. They can return a result or complete after completion of the closeConnection function or cancel function operations and preferably do not have any completion callback function.

An event notification module 428 or event notification system 428 can provide communication between the framework API 402 having the Telenav Link and other functions including the rest of the application. The Telenav Link can communicate with the event notification module 428 by publishing events of the Telenav Link including connection, disconnection and data-arrival. For sharing or sending data for other functions or parts of the application of the Telenav Link, the data simply needs to be published on the event notification system 428. Telenav Link takes the data for the events from the event notification system 428 and communicates, transmits, or carries the data through the communication protocol channel.

The communication system 100 has been described with module functions or order as an example. The communication system 100 can partition the modules differently or order the modules differently. For illustrative purposes, the transport arbitration module 406 is shown with the multi-transport arbitrator module 422, the discovery module 424, and the connected data channel module 426 in a row, it is understood that the modules can operate in any order including independently from the other modules.

The API 400 can be implemented in part or wholly as a hardware component such as a Printed Circuit Board, a Multi-Chip Module, a Thick Film Hybrid, a System in Package, an Application Specific Standard Part, an Application Specific Integrated Circuit or combination thereof including Standard Cell, Programmable Gate Array, Structured Design, Custom Design, or combination thereof.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively.

The physical transformation from the application programming interface 402 results in the movement in the physical world, such as images, audio, captured multimedia, or combination thereof. Movement in the physical world results in changes to the images, audio, captured multimedia, or combination thereof, representing the application data 502 by the application programming interface 402 including the application adaptation module 404, the transport arbitration module 406, the unified transport interface module 408, or the transport abstraction module 410.

The modules described in this application can be part of the first software 326 of FIG. 3, the second software 342 of FIG. 3, or a combination thereof. These modules can be stored in the first storage unit 314 of FIG. 3, the second storage unit 346 of FIG. 3, or a combination thereof. The first control unit 312 of FIG. 3, the second control unit 334 of FIG. 3, or combination thereof can execute these modules for operating the communication system 100.

The communication system 100 has been described with module functions or order as an example. The communication system 100 can partition the modules differently or order the modules differently. For example, the transport arbitration module 406 can include the multi-transport arbitrator module 422, the discovery module 424, or the connected data channel module 426 as separate modules although these modules can be combined into one. Also, the transport arbitration module 406 can be split into separate modules for implementing in the separate modules.

The modules described in this application can be hardware implementation, hardware circuitry, or hardware accelerators in the first control unit 312 or in the second control unit 334. The modules can also be hardware implementation, hardware circuitry, or hardware accelerators within the first device 102 or the second device 106 but outside of the first control unit 212 or the second control unit 234, respectively.

It has been discovered that the application adaptation module 402, the transport arbitration module 404, the unified transport interface module 406, the transport abstraction module 412, the system interface module 420, and the add transport module 416 of the API 400 including the Telenav Link provides a seamless way to connect automotive head units to handheld smart-phones over different communication protocols or media.

Further it has been discovered that the application adaptation module 402, the transport arbitration module 404, the unified transport interface module 406, the transport abstraction module 412, the system interface module 420, and the add transport module 416 identify the physical protocol stacks 418 such as wireless fidelity (WiFi), Bluetooth®, universal serial bus (USB), other communication protocols, or combination thereof, for concurrent use and to provide connectivity through whichever communication protocol or transport protocol is available at any given time. The physical protocol stack 418 can preferably be detected or identified by a transmission or a signal based on a particular or a specific of the physical protocol stack 418.

Yet further, it has been discovered that the application adaptation module 402, the transport arbitration module 404, the transport arbitration module 406, the transport abstraction module 410, the system interface module 420, and the add transport module 416 provide a uniform automatic discovery mechanism that can include a peer node. The uniform automatic discovery mechanism is preferably based on the Telenav Link including a Telenav Link or Tnlink service, leveraging underlying transport protocols or transport-specific service discovery protocols, such as Bluetooth, WiFi, USB, Bluetooth SDP, WiFi-direct/Bonjour, USB device discovery etc.

Figure 5:
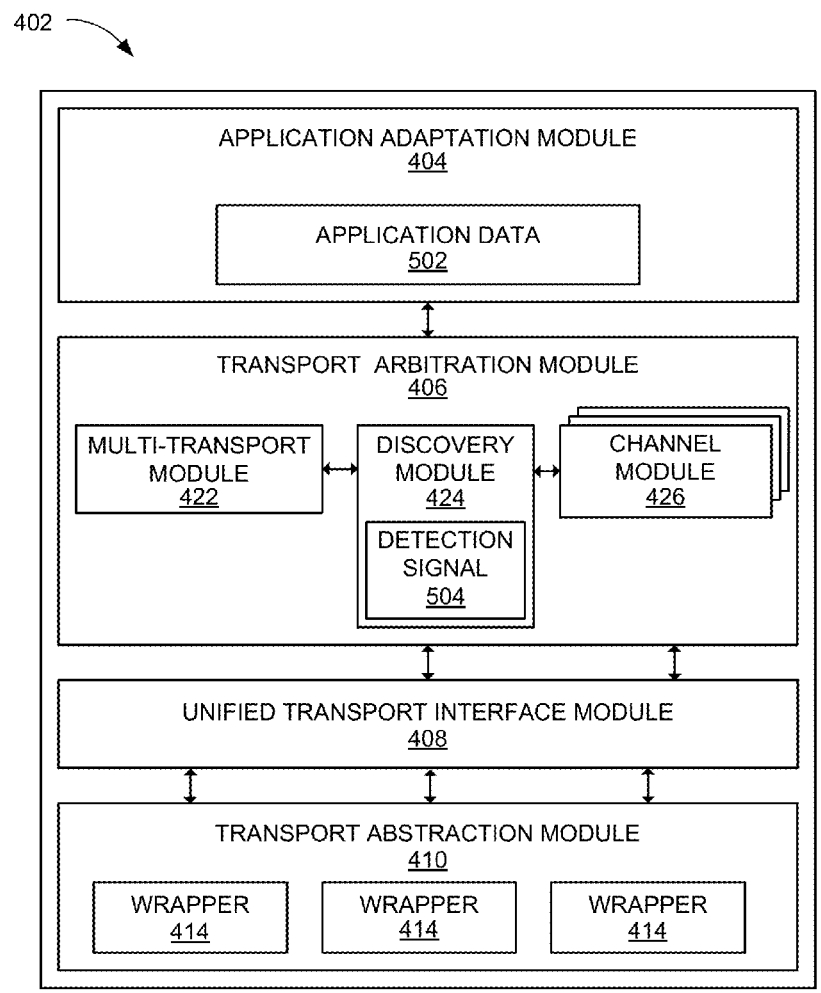
FIG. 5 is a control flow of the application programming interface (API) of the application programming interface system in an embodiment of the present invention.

Referring now to FIG. 5, therein is shown a control flow of the application programming interface (API) 402 of the application programming interface system 400 in an embodiment of the present invention. The application programming interface (API) 402 such as an API 402 includes the application adaptation module 404, the transport arbitration module 406, the unified transport interface module 408, and the transport abstraction module 410.

The application adaptation module 404 can include an application communication 502 or application data 502 including a communication 502 or data 502 of the application logic 412 of FIG. 4. The application adaptation module 404 preferably includes the application data 502 for sending or receiving with the application logic 412 and the system interface module 420 of FIG. 4 of the first device 102 of FIG. 1 or the second device 106 of FIG. 1.

The discovery module 424 of the transport arbitration module 406 preferably identifies or detects a detection transmission 504 or a detection signal 504 based on the protocol stacks 418 of FIG. 4 that are available in the system interface module 420 of the first device 102 or the second device 106. The physical protocol stack 418 of FIG. 4 can preferably be detected or identified by the detection transmission 504 or the detection signal 504 including a physical transport protocol detection signal 504 such as carrier signals, identification signals, acknowledgment signals, or combination thereof.

The application data 502 can be transmitted or communicated through the physical transport communication protocol with the transport wrapper 414 based on identification of the detection signal 504.

It has been discovered that the communication system 100 having the application adaptation module 404 with the application data 503 provides interoperability both in smart-phones and in automotive applications. The interface with the application programming interface (API) 402 such as an API 402 including the Telenav Link to both the smart-phone and automotive application are the same and can communicate in a peer-to-peer fashion.

Further, it has been discovered that the communication system 100 having the transport arbitration module 406 with the detection signal 504 provides an interface to, makes available, or exposes different communication transport protocol APIs to the application 412 that uses the, through different implementations of the Application Adaptation Layer.

Figure 6:
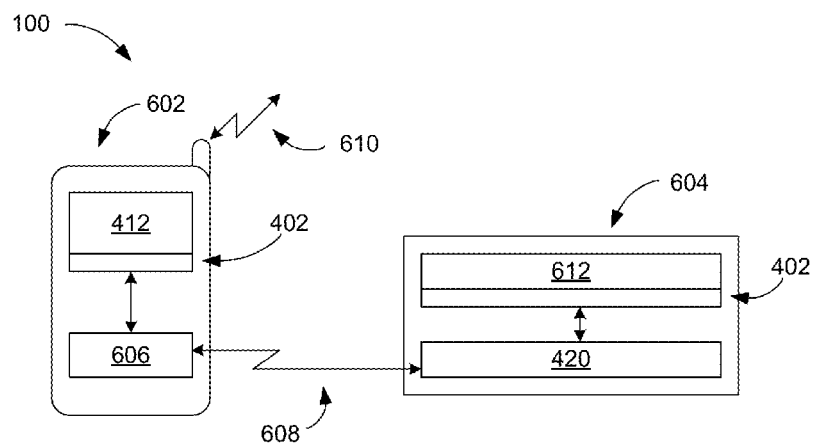
FIG. 6 is an exemplary network of the communication system in an embodiment of the present invention.

Referring now to FIG. 6, therein is shown an exemplary network 600 of the communication system 100 in an embodiment of the present invention. The exemplary network 600 preferably includes a handheld device 602, such as the first device 102 of FIG. 1 or the second device 106 of FIG. 1, and an automotive system 604 such an as in-dash device or an automotive head-unit.

The handheld device 602 preferably includes the API 402 with the transport abstraction module 412 coupled to an operating system 610 such as a smart-phone operating system (OS) 0. The operating system 606 can communicate with the automotive system 604 with a network 608 such as a physical transport such as an underlying medium-access API provided by an operating system, device drivers, or combination thereof. The handheld device 602 can optionally communicate with a wireless network 610 such as a data network, cellular network, other handheld networks, or combination thereof The automotive system 604 can preferably include the API 402 with an automotive application 612 coupled to the operating system interface module 420 for communication with the network 608. The API 402 can connect the transportation module 416 of the handheld device 602 and the system interface module 420 of the automotive system 604 with multiple communication protocols.

It has been discovered that the API 402 including the Telenav Link including the Unified Transport Interface of the unified transport interface module 408 enables communication of the application logic 412 of FIG. 4, independent of a particular of the physical protocol stack 418. The Unified Transport Interface is defined in terms of asynchronous functions for network send or receive operations to allow maximum resource utilization.

Figure 7:
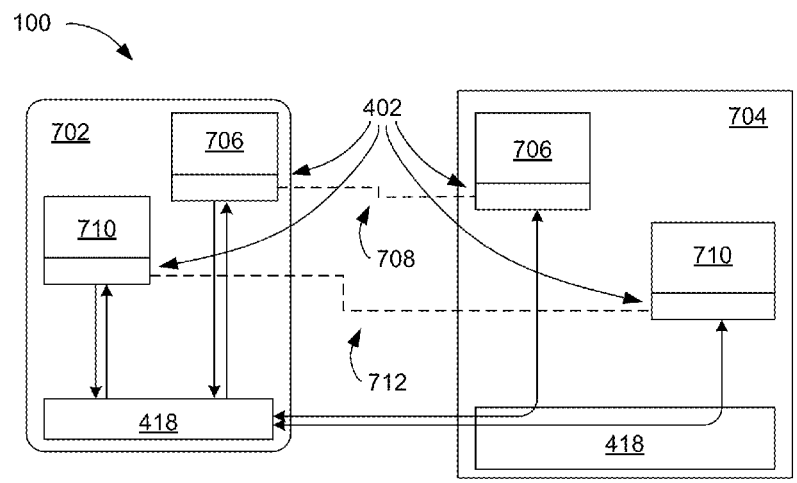
FIG. 7 is an exemplary network of the communication system in an embodiment of the present invention.

Referring now to FIG. 7, therein is shown an exemplary network 700 of the communication system 100 in an embodiment of the present invention. The exemplary network 700 preferably includes a handheld device 702, such as the first device 102 of FIG. 1 or the second device 106 of FIG. 1, and an automotive system 704 such an as in-dash device or an automotive head-unit.

The handheld device 702 preferably includes two of the API 402. One of the API 402 can be coupled to a first application 706 such as a navigation application, a Telenav Navigator application, or other handheld device application. The first application 706 can communicate with the automotive system 704 with a first network 708 such as a physical transport such as an underlying medium-access API provided by an operating system, device drivers, or combination thereof.

Another of the API 402 of the handheld device 702 can be coupled to a second application 710 such as a messaging application, an instant messaging application, or other handheld device application. The second application 710 can communicate with the automotive system 704 with a second network 712 such as a physical transport such as an underlying medium-access API provided by an operating system, device drivers, or combination thereof.

Multiple instances of the API 402 of the handheld device 702 include identifiers parameterizing the Telenav Link to multiplex underlying protocols. The API 402 coupled to the first application 706 can be parameterized for the first network 708. Similarly, the API 402 coupled to the second application 710 can be parameterized for the second network 712.

For the example, each of the Telenav Links of the handheld device 702 can be parameterized with different universal unique identifiers (UUID) for a physical transport such as a service-UUID for multiplexing with the physical protocol stack 418 over a common network such as Bluetooth®.

Similarly, the automotive system 704 also includes two of the API 402. One of the API 402 can be coupled to the first application 706 such as a navigation application, a Telenav Navigator application, or other handheld device application. The first application 706 can communicate with the automotive system 704 with the first network 708 such as a physical transport such as an underlying medium-access API provided by an operating system, device drivers, or combination thereof.

Another of the API 402 of automotive system 704 can be coupled to the second application 710 such as a messaging application, an instant messaging application, or other handheld device application. The second application 710 can communicate with the automotive system 704 with a second network 712 such as a physical transport such as an underlying medium-access API provided by an operating system, device drivers, or combination thereof.

Multiple instances of the API 402 of the automotive system 704 can include identifiers parameterizing the Telenav Link to multiplex underlying protocols. The API 402 coupled to the first application 706 can be parameterized for the first network 708. Similarly, the API 402 coupled to the second application 710 can be parameterized for the second network 712.

For the example, each of the Telenav Links of the automotive system 704 can be parameterized with different universal unique identifiers (UUID) for a physical transport such as a service-UUID for multiplexing with the physical protocol stack 418 over a common network such as Bluetooth®.

It has been discovered that the API 402 can multiplex underlying protocols with different universal unique identifiers (UUID) for a physical transport. The different UUIDs can be service-UUIDs for a common physical transport.

Figure 8:
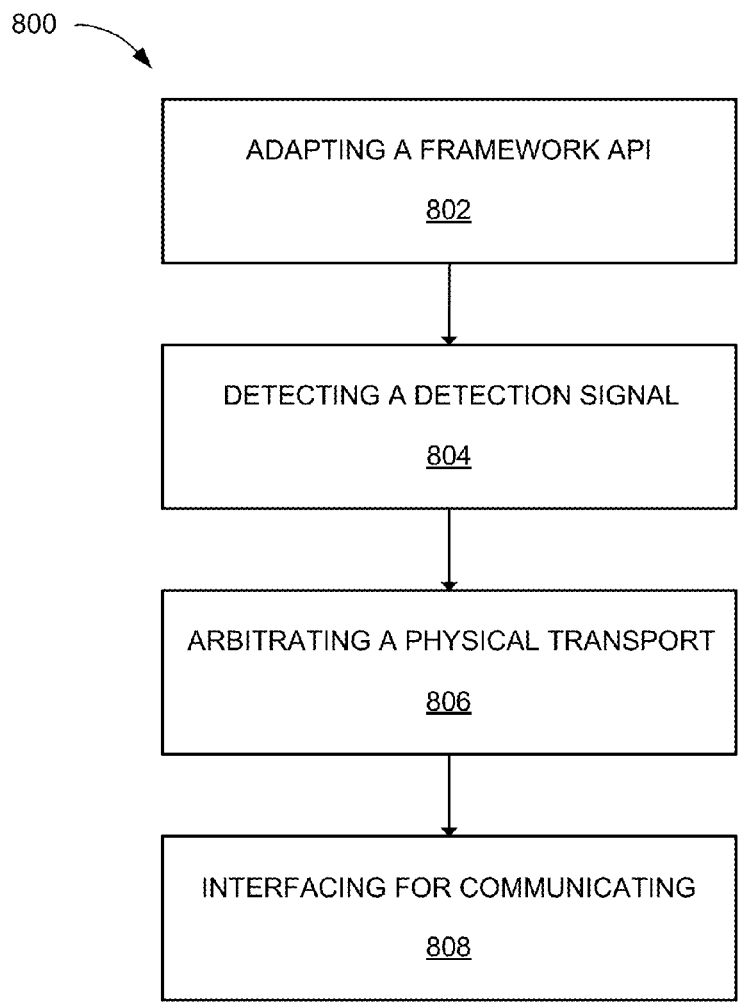
FIG. 8 is a flow chart of a method of operation of a communication system in an embodiment of the present invention.

Referring now to FIG. 8, therein is shown a flow chart of a method 800 of operation of a communication system 100 in an embodiment of the present invention. The method 800 includes: adapting an application programming interface (API) for communicating with an application using a control unit in a block 802; identifying a detection signal for identifying a physical transport for communication with the application through the application programming interface (API) in a block 804; arbitrating a physical transport protocol for the physical transport with the application programming interface (API) in a block 806; and connecting a transport wrapper for the transport protocol with the application programming interface (API) for communicating with the physical transport for displaying on a device in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a communication system comprising:
    adapting, with a control unit, an application programming interface (API) for communicating with an application;
    identifying a detection signal for identifying a physical transport for communication with the application through the application programming interface (API);
    arbitrating a physical transport protocol for the physical transport with the application programming interface (API) includes detecting a physical protocol stack; and
    connecting a transport wrapper for the transport protocol with the application programming interface (API) for communicating with the physical transport.

2. The method as claimed in claim 1 wherein connecting the transport wrapper with the application programming interface (API) is for communicating with an automotive system.

3. The method as claimed in claim 1 further comprising setting a multiple connections preference.

4. The method as claimed in claim 1 further comprising integrating another physical transport protocol with the application programming interface.

5. The method as claimed in claim 1 further comprising publishing events of the application programming interface.

6. A method of operation of a communication system comprising:
    adapting, with a control unit, an application programming interface (API) for communicating with an application;
    identifying a detection signal for identifying a physical transport for communication with the application through the application programming interface (API);
    arbitrating a physical transport protocol for the physical transport with the application programming interface (API) includes detecting a physical protocol stack;
    connecting a transport wrapper for the transport protocol with the application programming interface (API) for communicating with the physical transport; and
    transmitting data for communication between the application and the physical transport.

7. The method as claimed in claim 6 wherein connecting the transport wrapper with the application programming interface (API) is for communicating with a handheld device and an automotive system.

8. The method as claimed in claim 6 further comprising setting a multiple connections preference to override a default.

9. The method as claimed in claim 6 further comprising integrating a proprietary physical transport protocol with the application programming interface.

10. The method as claimed in claim 6 further comprising publishing events of the application programming interface for communicating with other functions.

11. A communication system comprising:
    a control unit configured to:
        adapt an application programming interface (API) for communicating with an application,
        identify a detection signal for identifying a physical transport for communication with the application through the application programming interface (API) includes detecting a physical protocol stack, and
        arbitrate a physical transport protocol for the physical transport with the application programming interface (API); and
    a communication unit, coupled to the control unit, configured to connect a transport wrapper for the transport protocol with the application programming interface (API) for communicating with the physical transport.

12. The system as claimed in claim 11 wherein the control unit is further configured to connect the transport wrapper with the application programming interface (API) for communicating with an automotive system.

13. The system as claimed in claim 11 wherein the control unit is further configured to set a multiple connections preference.

14. The system as claimed in claim 11 wherein the control unit is further configured to integrate another physical transport protocol with the application programming interface.

15. The system as claimed in claim 11 wherein the control unit is further configured to publish events of the application programming interface.

16. The system as claimed in claim 11 wherein the communication unit is configured to transmit data for communication between the application and the physical transport.

17. The system as claimed in claim 16 wherein the communication unit is configured for communicating with the physical transport includes communicating with a handheld device and an automotive system.

18. The system as claimed in claim 16 wherein the control unit is further configured to set a multiple connections preference to override a default.

19. The system as claimed in claim 16 wherein the control unit is further configured to integrate a proprietary physical transport protocol with the application programming interface.

20. The system as claimed in claim 16 wherein the control unit is further configured to publish events of the application programming interface for communicating with other functions.

* * * * *